US009862364B2

(12) United States Patent
Fairfield

(10) Patent No.: US 9,862,364 B2
(45) Date of Patent: Jan. 9, 2018

(54) COLLISION MITIGATED BRAKING FOR AUTONOMOUS VEHICLES

(71) Applicant: Waymo LLC, Mountain View, CA (US)

(72) Inventor: Nathaniel Fairfield, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 3 days.

(21) Appl. No.: 14/959,067

(22) Filed: Dec. 4, 2015

(65) Prior Publication Data

US 2017/0158175 A1 Jun. 8, 2017

(51) Int. Cl.
*B60T 7/12* (2006.01)
*G05D 1/00* (2006.01)
(Continued)

(52) U.S. Cl.
CPC .......... *B60T 7/12* (2013.01); *B60T 8/17558* (2013.01); *G05D 1/0055* (2013.01);
(Continued)

(58) Field of Classification Search
CPC .. G05D 1/0077; G05D 1/0088; G05D 1/0055; B60T 7/12
See application file for complete search history.

(56) References Cited

U.S. PATENT DOCUMENTS

| 6,370,475 | B1 * | 4/2002 | Breed | ................ B60N 2/2863 340/436 |
| 7,379,014 | B1 * | 5/2008 | Woodell | ............... G01S 13/87 342/29 |

(Continued)

FOREIGN PATENT DOCUMENTS

EP 2208654 A1 7/2010

OTHER PUBLICATIONS

Coelingh, Erik et al., Collision Warning with Full Auto Brake and Pedestrian Detection—a practical example of Automatic Emergency Braking, 13th International IEEE, Annual Conference on Intelligent Transportation Systems, Madeira Island, Portugal, Sep. 19-22, 2010, pp. 155-160.

(Continued)

*Primary Examiner* — Rami Khatib
*Assistant Examiner* — Jeffrey Boomer
(74) *Attorney, Agent, or Firm* — Lerner, David, Littenberg, Krumholz & Mentlik, LLP

(57) ABSTRACT

Aspects of the disclosure involve a collision mitigated braking system employed in vehicles operating in a self-driving (autonomous) mode. Collision mitigated braking provides redundancy to the vehicle's main driving system in emergency situations. The collision mitigated braking system is configured to cause the vehicle to come to a stop when an imminent collision is perceived and the main driving system has not initiated a braking maneuver. A perception component employs information received from vehicle sensors, analyzing the sensor data to identify nearby objects of interest that are determined to be in the vehicle's path or that could otherwise collide with the vehicle. A control component evaluates the objects of interest to determine whether immediate braking is required. If this is the case and the main driving system has not begun to brake, the control component causes the vehicle to perform immediate braking to avoid a possible collision.

15 Claims, 9 Drawing Sheets

(51) Int. Cl.
*B60T 8/1755* (2006.01)
*B60T 7/22* (2006.01)

(52) U.S. Cl.
CPC ......... *G05D 1/0077* (2013.01); *G05D 1/0088* (2013.01); *B60T 7/22* (2013.01); *B60T 2201/024* (2013.01); *B60T 2210/36* (2013.01)

(56) References Cited

U.S. PATENT DOCUMENTS

| | | | | |
|---|---|---|---|---|
| 7,409,295 | B2* | 8/2008 | Paradie | G06T 7/70 701/301 |
| 7,782,256 | B2* | 8/2010 | Smith | G01S 5/06 342/453 |
| 8,384,531 | B2 | 2/2013 | Szczerba et al. | |
| 8,977,007 | B1* | 3/2015 | Ferguson | G06K 9/00825 340/988 |
| 9,344,856 | B2* | 5/2016 | Zhang | |
| 2004/0193374 | A1* | 9/2004 | Hac | B60K 31/0008 701/301 |
| 2006/0031015 | A1* | 2/2006 | Paradie | G06T 7/70 701/301 |
| 2007/0219720 | A1* | 9/2007 | Trepagnier | B60W 30/00 701/300 |
| 2008/0119993 | A1* | 5/2008 | Breed | B60R 21/0134 701/46 |
| 2008/0183360 | A1* | 7/2008 | Zhang | B60W 50/14 701/70 |
| 2009/0037055 | A1 | 2/2009 | Danner et al. | |
| 2011/0040481 | A1* | 2/2011 | Trombley | G08G 1/163 701/301 |
| 2011/0184605 | A1* | 7/2011 | Neff | G05D 1/0231 701/25 |
| 2012/0085458 | A1* | 4/2012 | Wenzel | A01F 25/14 141/10 |
| 2012/0095660 | A1 | 4/2012 | Breuer et al. | |
| 2012/0140061 | A1* | 6/2012 | Zeng | G01S 13/726 348/135 |
| 2012/0203418 | A1* | 8/2012 | Braennstroem | B60W 30/09 701/23 |
| 2012/0271540 | A1* | 10/2012 | Miksa | G01C 21/30 701/409 |
| 2012/0277988 | A1* | 11/2012 | Sosulin | G01S 19/22 701/301 |
| 2013/0030651 | A1* | 1/2013 | Moshchuk | G08G 1/166 701/41 |
| 2013/0110368 | A1 | 5/2013 | Zagorski | |
| 2013/0124053 | A1* | 5/2013 | Sandstroem | B60R 21/0134 701/46 |
| 2013/0253793 | A1* | 9/2013 | Lee | B60W 50/029 701/70 |
| 2013/0279491 | A1* | 10/2013 | Rubin | G08G 1/166 370/347 |
| 2014/0025270 | A1 | 1/2014 | Kosanam et al. | |
| 2014/0032089 | A1* | 1/2014 | Aoude | G08G 1/00 701/117 |
| 2015/0175159 | A1 | 6/2015 | Gussner et al. | |
| 2016/0018511 | A1* | 1/2016 | Nayyar | G01S 13/343 342/27 |
| 2017/0090476 | A1* | 3/2017 | Letwin | G05D 1/0077 |
| 2017/0129487 | A1* | 5/2017 | Wulf | B60W 30/09 |

OTHER PUBLICATIONS

Labayrade, Raphael et al., A Collision Mitigation System using Laser Scanner and Stereovision Fusion and its Assessment, IEEE, 2005, pp. 441-446.
Segata, Michele et al., Automatic Emergency Braking: Realistic Analysis of Car Dynamics and Network Performance, IEEE Transactions on Vehicular Technology, Nov. 2013, vol. 62, No. 9, pp. 4150-4160.
International Search Report and Written Opinion for PCT Application No. PCT/US2016/061798, dated Feb. 21, 2017.

* cited by examiner

800

COLLISION MITIGATED BRAKING FOR AUTONOMOUS VEHICLES

BACKGROUND

A number of vehicles, including higher end cars, include collision avoidance or forward collision warning systems. Such systems can detect a collision with an object that is within some threshold distance of the vehicle, for instance using radar or a camera. When a collision is detected, the system automatically applies braking to slow or stop the vehicle.

BRIEF SUMMARY

Autonomous vehicles, such as vehicles which do not require a human driver or which can operate in an autonomous driving mode, can transport of passengers to particular locations. One aspect of an autonomous vehicle is the perception system, which allows the vehicle to perceive and interpret its surroundings using lasers, cameras, radar, and other types of sensors. The perception system is used to help control operation of the autonomous vehicle by a main driving system, which manages different operations including speeding up, slowing down, stopping, turning, etc.

Aspects of the technology relate to a collision mitigated braking system (CMBS) in vehicles operating in a self-driving (autonomous) mode. The CMBS provides an independent backup that operates in parallel with the vehicle's main driving system. The CMBS is capable of bringing the vehicle to a stop when there is a fault or other problem with the main driving system or a collision with another object is perceived to be imminent and the main driving system has not initiated a braking maneuver.

In one scenario, a computer-implemented method for collision mitigated braking is provided in a vehicle operating in an autonomous mode. The method comprises receiving, by one or more processors of one or more computing devices, heading and location information of one or more objects located externally to the vehicle from one or more sensors of the vehicle; analyzing, by the one or more processors, the received heading and location information to filter selected ones of the objects that may collide with the vehicle in accordance with a predetermined false positive collision rate; evaluating, by the one or more processors, the filtered selected objects to determine whether immediate braking is required to avoid a collision with any of the filtered selected objects; and when it is determined that immediate braking is required and a main driving system of the vehicle has not initiated braking during the autonomous mode, sending a signal from the one or more processors to a deceleration system of the vehicle to initiate immediate braking.

According to one example, the analyzing comprises independently evaluating the received heading and location information from laser and radar sensors of the vehicle. In another example, evaluating the selected objects includes evaluating a stopping distance model to calculate a distance to stop based upon the current movement of the vehicle, a model of the braking system, and a maximum braking amount. In a further example, filtering the selected objects includes applying a padded polygon to different objects detected by the one or more sensors. Here, a size and shape of each padded polygon may be based on one or more factors selected from the group consisting of a buffer braking distance from the front bumper of the vehicle to a respective object; a sweep volume of the front bumper; and the vehicle's predicted path from a current time to a future time.

In another example, evaluating the selected objects includes predicting a future position of the vehicle at one or more points in time, in accordance with a primary path and speed plan obtained from a planning component of the main driving system. According to a further example, the signal sent to the braking system of the vehicle to initiate immediate braking causes the braking system to bring the vehicle to a complete stop. And in yet another example, the signal sent to the braking system of the vehicle to initiate immediate braking causes the braking system to slow the vehicle according to a minimal braking threshold. In this case, slowing the vehicle may be performed until there is no longer a danger of imminent collision.

According to another aspect, a vehicle control system for a vehicle is provided. The vehicle control system comprises one or more computing devices configured to: receive heading and location information of one or more objects located externally to the vehicle from one or more sensors of the vehicle; analyze the received heading and location information to filter selected ones of the objects that may collide with the vehicle in accordance with a predetermined false positive collision rate; evaluate the filtered selected objects to determine whether immediate braking is required to avoid a collision with any of the filtered selected objects; and, when it is determined that immediate braking is required and a main driving system of the vehicle has not initiated braking during an autonomous driving mode, send a signal to initiate immediate braking of the vehicle.

In one example, the one or more computing devices are configured to filter the selected objects by applying a padded polygon to different objects detected by the one or more sensors. Here, a size and shape of each padded polygon may be based on one or more factors selected from the group consisting of a buffer braking distance from the front bumper of the vehicle to a respective object; a sweep volume of the front bumper; and the vehicle's predicted path from a current time to a future time.

According to another example, evaluation of the selected objects includes predicting a future position of the vehicle at one or more points in time, in accordance with a primary path and speed plan obtained from a planning component of the main driving system. In a further example, the signal sent to the braking system of the vehicle to initiate immediate braking causes the braking system to bring the vehicle to a complete stop. Alternatively, the signal sent to the braking system of the vehicle to initiate immediate braking causes the braking system to slow the vehicle according to a minimal braking threshold. In this case, slowing the vehicle may be performed until there is no longer a danger of imminent collision.

Another aspect of the disclosure provides a non-transitory computer-readable medium on which instructions are stored. The instructions, when executed by one or more processors, cause the one or more processors to perform a method for collision mitigated braking in a vehicle operating in an autonomous mode. Here, the method comprises receiving heading and location information of one or more objects located externally to the vehicle from one or more sensors of the vehicle; analyzing the received heading and location information to filter selected ones of the objects that may collide with the vehicle in accordance with a predetermined false positive collision rate; evaluating the filtered selected objects to determine whether immediate braking is required to avoid a collision with any of the filtered selected objects; and, when it is determined that immediate braking is required and a main driving system of the vehicle has not initiated braking during the autonomous mode, sending a signal from the one or more processors to a deceleration system of the vehicle to initiate immediate braking.

In one example, the analyzing comprises independently evaluating the received heading and location information from laser and radar sensors of the vehicle. In another example, evaluating the selected objects includes evaluating a stopping distance model to calculate a distance to stop based upon the current movement of the vehicle, a model of the braking system, and a maximum braking amount. And in a further example, filtering the selected objects includes applying a padded polygon to different objects detected by the one or more sensors.

DETAILED DESCRIPTION

Overview

As mentioned above, the present disclosure relates to a collision mitigated braking system (CMBS) in vehicles capable of operating in a self-driving (autonomous) mode. The CMBS incorporates both perception and control components. The CMBS perception component may include information received from on-board laser and radar sensors, and possibly other types of sensors as well, such as cameras. The perception component analyzes the sensor data to identify relevant nearby objects that are in the path of the vehicle or that could collide with the vehicle. Preferably, this is done in a way that is as simple and robust as possible. One goal is to avoid false positives, in other words to have a very low false positive rate below a determined threshold. The control component evaluates the objects detected by the perception component, along with information from other onboard systems, to determine whether immediate braking is required. If so, the control component issues instructions to a deceleration system to perform a braking operation.

Example Systems

Figure 1:
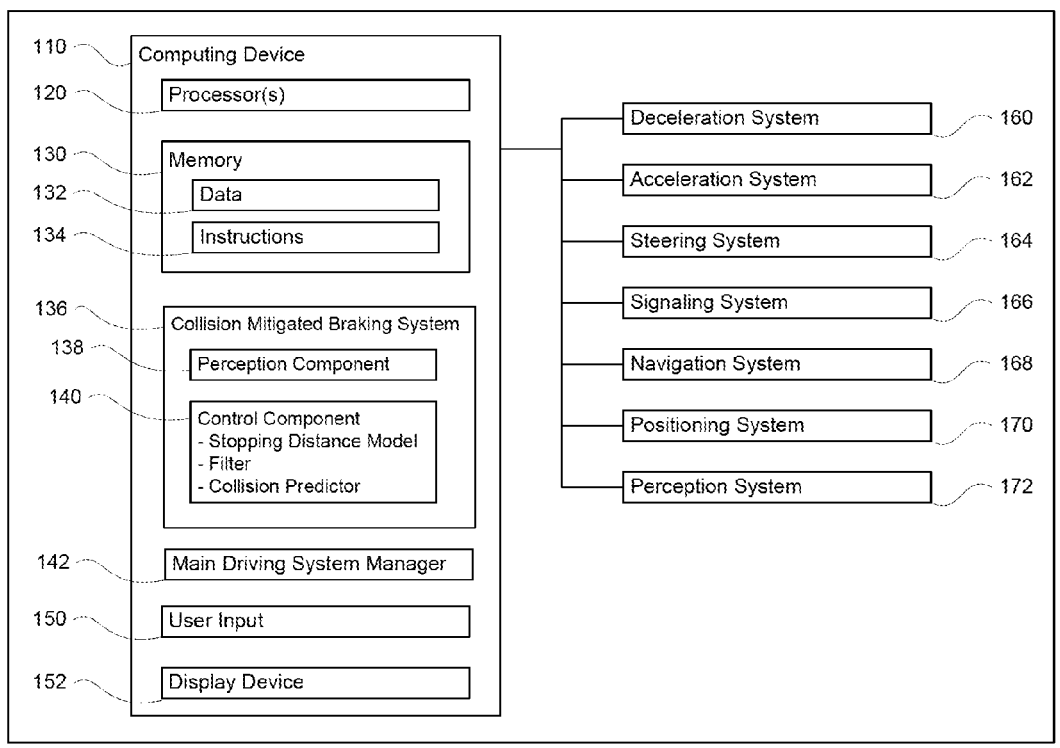
FIG. 1 is a functional diagram of an autonomous vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle capable of operating in an autonomous mode including, but not limited to, cars, trucks, motorcycles, buses, boats, airplanes, helicopters, lawn maintenance equipment, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods in accordance with the technology herein may include different combinations of the foregoing, whereby different portions of the instructions and data are stored on different types of media. The data may also be formatted in any suitable computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory 130 may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and one or more displays 152 (e.g., a monitor having a screen, a small LCD touch-screen or any other electrical device that is operable to display information). In one example, the vehicle 100 includes an interior display 152. In this regard, interior display 152 may be located within a cabin of the vehicle 100 and may be used by computing device 110 to provide information to passengers of the vehicle 100.

In one example, computing device 110 may be an autonomous driving computing system incorporated into vehicle 100. The autonomous driving computing system may be capable of communicating with various components of the vehicle as needed in order to control the vehicle in a fully autonomous driving mode (without input from a driver), as well as semi-autonomous (some input from a driver) driving mode.

Figure 2:
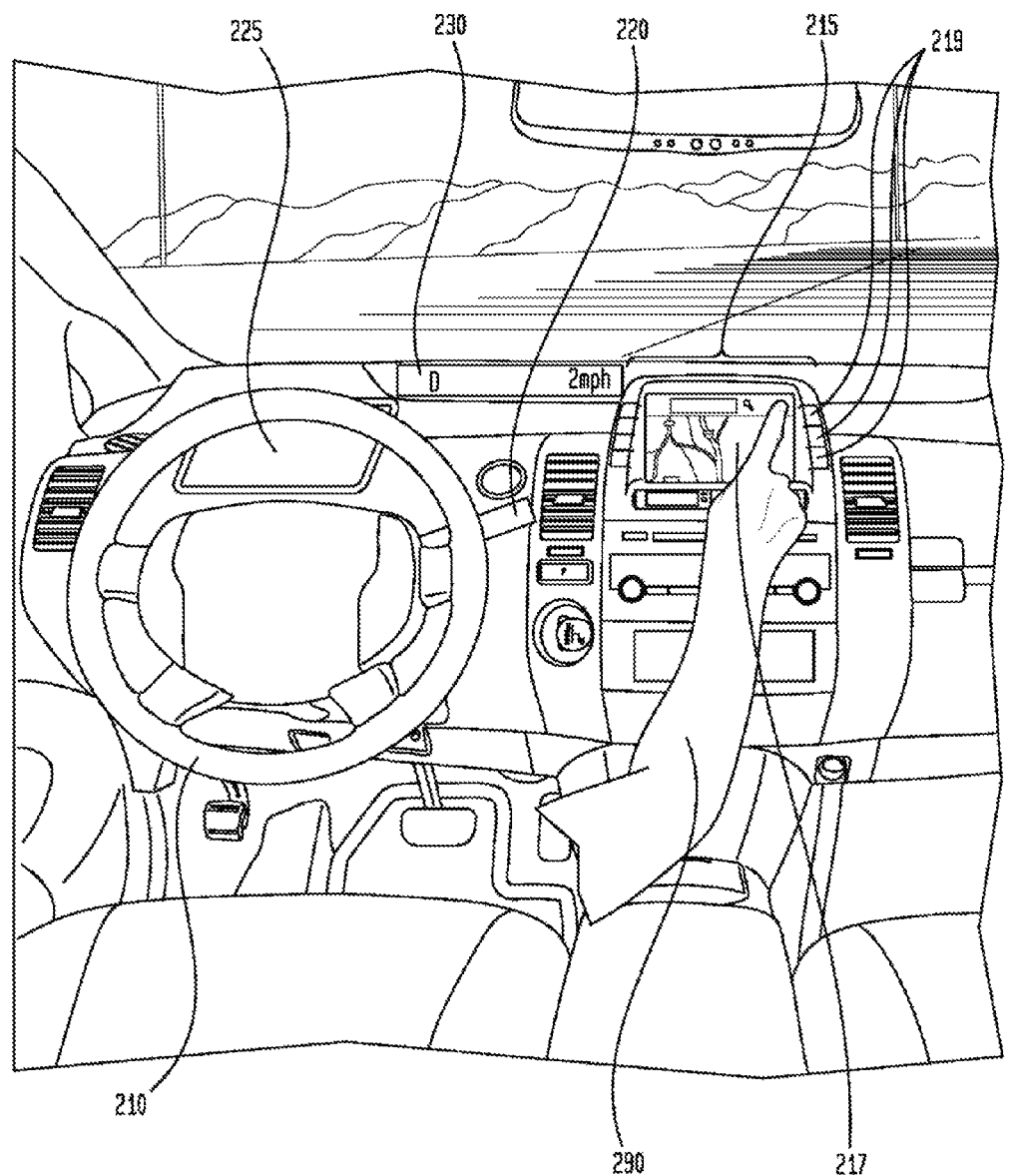
FIG. 2 illustrates an interior of an autonomous vehicle in accordance with aspects of the disclosure.

As an example, FIG. 2 depicts the interior arrangement of a vehicle capable of operating in autonomous (self-driving), semiautonomous, and manual (continuous input from a driver) driving modes. In this regard, the autonomous vehicle 100 may include all of the features of a non-autonomous vehicle, for example: a steering apparatus, such as steering wheel 210; a navigation display apparatus, such as navigation display 215 (which may be a part of the display 152); and a gear selector apparatus, such as gear shifter 220. The interior of the vehicle may also have various user input devices 150 in addition to the foregoing, such as touch screen 217 (again, which may be a part of display 152), or button inputs 219, for activating or deactivating one or more autonomous driving modes and for enabling a driver or passenger 290 to provide information, such as a navigation destination, to the computing device 110.

Returning to FIG. 1, when engaged, computing device 110 may control some or all of the driving functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication with various systems of vehicle 100, such as deceleration system 160, acceleration system 162, steering system 164, signaling system 166, navigation system 168, positioning system 170, and perception system 172. One or more of these systems working together may be used to control the movement, speed, direction, etc. of vehicle 100 in accordance with the instructions 134 stored in memory 130. For instance, a main driving system manager 142, which is preferably part of the computing device 110, may directly or indirectly manage the functions of systems 160-172.

By way of example, the main driving system manager 142 of computing device 110 may interact with deceleration system 160 and acceleration system 162 in order to control the speed of the vehicle. Similarly, steering system 164 may be used by the main driving system manager 142 in order to control the direction of vehicle 100. For example, if vehicle 100 is configured for use on a road, such as a car or truck, the steering system may include components to control the angle of the wheels to turn the vehicle. Signaling system 166 may be used by the main driving system manager 142 in order to signal the vehicle's intent to other drivers or vehicles, for example, by lighting turn signals or brake lights when needed.

Navigation system 168 may be used by the main driving system manager 142 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, bike lanes, or other such objects and information. Additionally, the map information may be updated to include temporary information, such as temporarily blocked lanes due to construction, accident information, etc.

Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to cars or other objects immediately around the vehicle, which can often be determined with less noise than absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Perception system 172 includes one or more components for detecting and performing analysis on objects external to the vehicle, such as other vehicles, obstacles in the roadway, pedestrians, bicyclists, traffic signals, signs, trees, etc. For example, the perception system 172 may include lasers, sonar, radar, one or more cameras, or any other detection devices that receive or otherwise obtain data that may be further processed by computing device 110. In the case where the vehicle is a small passenger vehicle, such as a car, the car may include a laser mounted on the roof or other convenient location, as well as other sensors, such as cameras, radars, sonars, and additional lasers.

Accordingly, the main driving system manager 142 may control the direction and speed of the vehicle based information provided by the vehicle's various systems described above. A planning component of the main driving system manager 142 may generate a predicted path or route of the vehicle 100 based on the provided information. By way of example, if the vehicle is operating completely autonomously (self-driving), main driving system manager 142 may navigate the vehicle to a location using data from the detailed map information and navigation system 168. Main driving system manager 142 may use the positioning system 170 to determine the vehicle's location. Information from the perception system 172 may be used to detect and respond to objects when needed to reach a location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Also shown in FIG. 1 is collision mitigated braking system 136. Like the main driving system manager 142, the collision mitigate braking system 136 is preferably part of the computing device 110, although both the manager 142 and the system 136 may be separate components or subsystems. Here, the collision mitigated braking system 136 includes a perception component 138 and a control component 140. The perception component 138 is operatively coupled to at least perception system 172. The control component 140 is operatively coupled to at least the deceleration system 160 and preferably the main driving system manager 142. As shown in FIG. 1, the control component may include a stopping distance model, a filter and a collision predictor.

In one example, the perception and control components of the collision mitigated braking system 136 are separate from perception and control components of the main driving system manage 142 of the vehicle 100. In one scenario, CMBS 136 does not have its own separate planning component or module. In this case, planning information from the main driving system manager 142, e.g., the vehicle's expected trajectory, is analyzed by the control component 140 to determine whether a collision is imminent and braking must be applied. In another scenario, the CMBS 136 may not be informed whether the main driving system manager 142 is responding to any particular object in the vicinity of the vehicle. In view of this, if no action is taken by the main driving system manager 142, the control component 140 of CMBS 136 would apply the brakes via the deceleration system 160 at the last moment to avoid a collision with an object identified by the perception component 138. By way of example, this may include emergency braking within a few seconds (or more or less) of a possible collision.

While the laser and radar sensor data from the perception system 172 could be fused together by the CMBS 136 and analyzed collectively, this may require computing resources and take valuable processing time. In turn, this could potentially result in a delay, which could adversely impact emergency braking. Thus, another option is to independently evaluate the different information received from different sensors or groups of sensors. Also, the perception component 138 may not account for curvature or other path changes that the main driving system manager 142 would normally account for.

Figure 3:
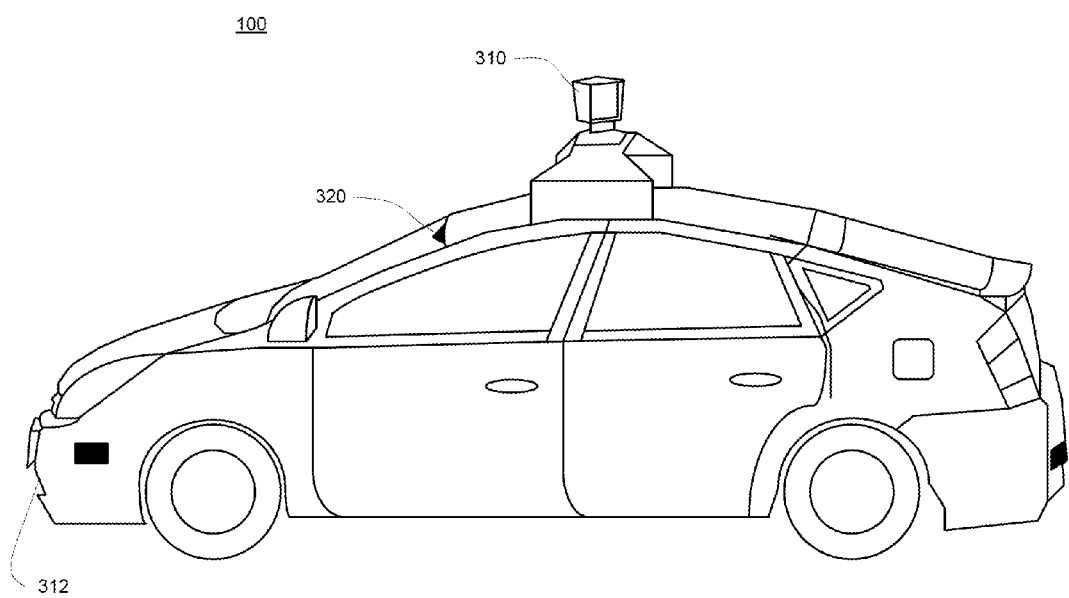
FIG. 3 illustrates an exterior of an autonomous vehicle in accordance with aspects of the disclosure.

FIG. 3 is an example external view of vehicle 100 described above. As shown, various components of the perception system 172 may be positioned on or in the vehicle 100 in order to better detect external objects while the vehicle is being driven. In this regard, one or more sensors, such as laser range finders 310 and 312 may be positioned or mounted on the vehicle. As an example, the one or more computing devices 110 (not shown) may control laser range finder 310, e.g., by rotating the laser range finder 310 180 degrees or more. In addition, the perception system may include one or more cameras 320 mounted internally on the windshield of vehicle 100 or elsewhere to receive and analyze various images about the environment. In addition to the laser range finders 310, 312 and the one or more cameras 320, other detection devices (sensors), such as sonar, radar, GPS, etc., may also be positioned in a similar manner on and around the vehicle 100.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
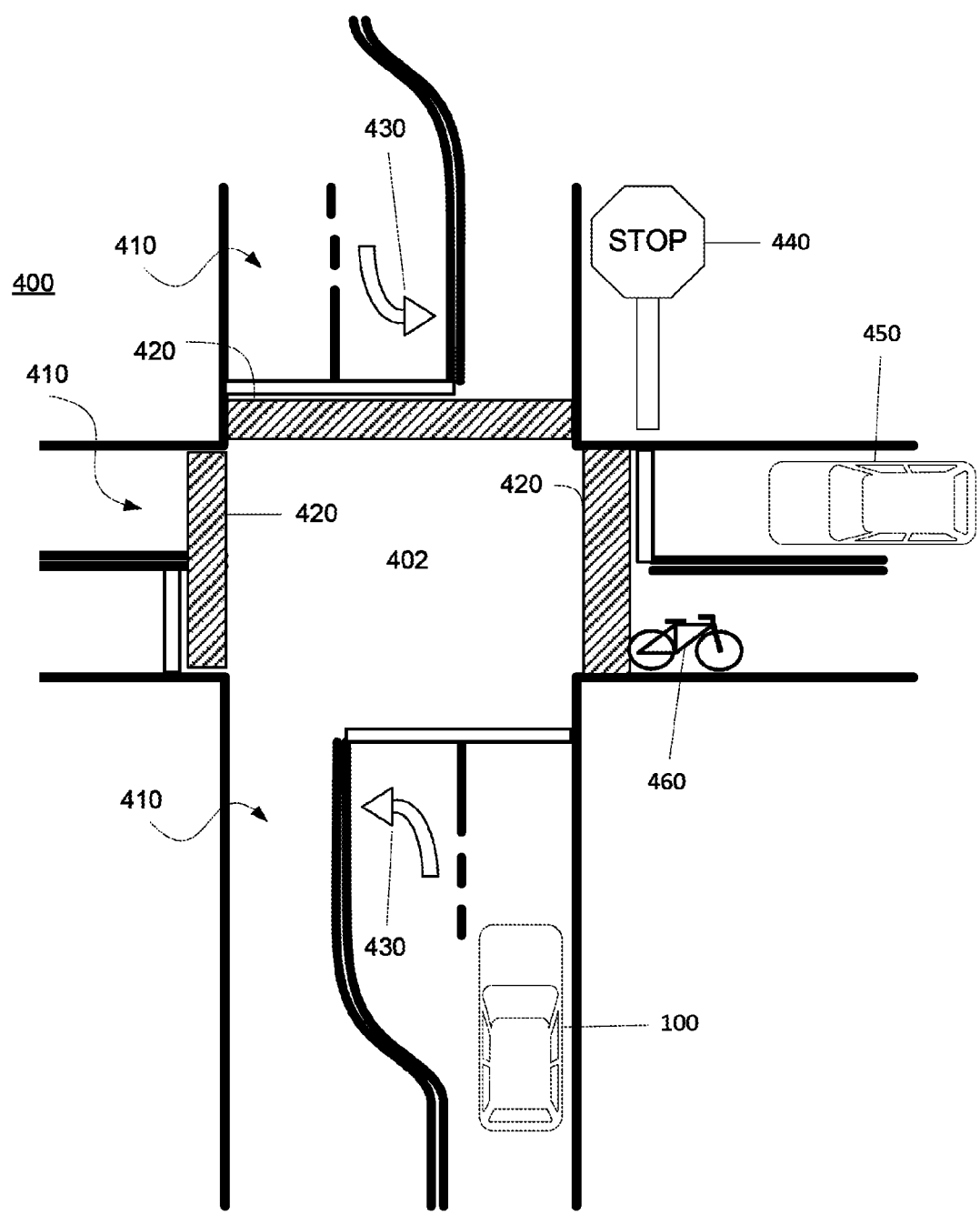
FIGS. 4 and 5 are example scenarios showing objects identified by a perception element of an autonomous vehicle in accordance with aspects of the disclosure.

As noted above, a vehicle's one or more computing devices may maneuver the vehicle using the various systems described above, in either an autonomous or semi-autonomous mode. In the example of FIG. 4, vehicle 100 is depicted on a section of roadway 400 approaching an intersection 402. In this example, the roadway 400 adjacent intersection 400 includes lane lines 410, crosswalks 420, turn-only lanes 430, and signage such as stop sign 440. For instance, as the vehicle 100 is being maneuvered, perception elements including one or both of the perception system 172 and the perception component 138 may detect various objects in the vehicle's environment. In the example of FIG. 4, the perception system 172 may detect the lane lines 410, the crosswalks 420; the turn only lanes 430, and the stop sign 440. In addition, the perception elements may also detect the location of various objects along the roadway, including vehicle 450 and a bicycle 460.

Figure 5:
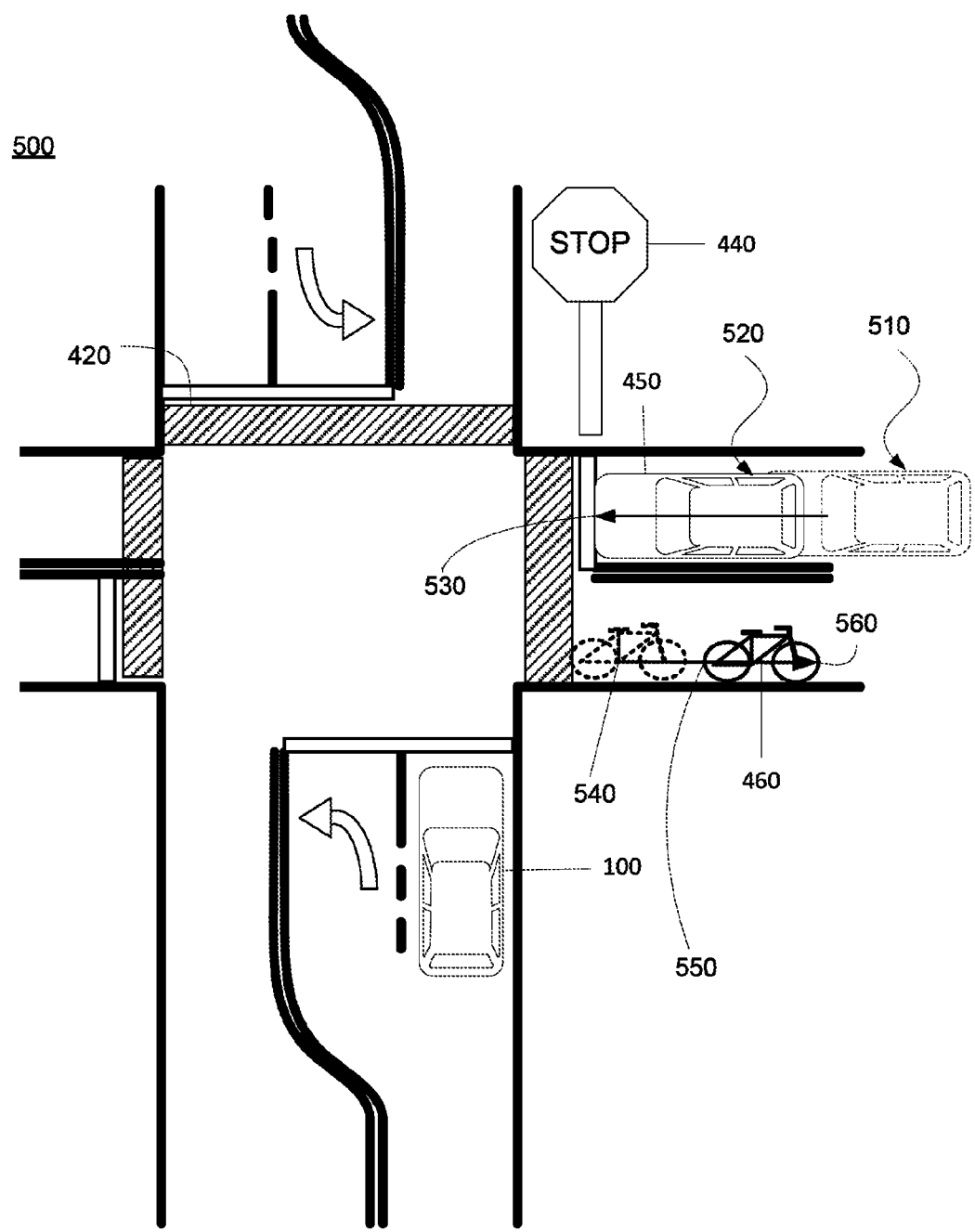

By tracking the location of objects over a brief period of time, the perception elements may also determine a heading and speed for each of the objects in the vicinity of the vehicle 100. This brief period of time may be a fraction of a second or more or less. In addition, this information may be plotted in order to determine a past trajectory of the object. This information may be used to determine a heading, a speed, a location, whether there is a change in speed (such as acceleration or deceleration) or heading, for the object. As shown in the example of FIG. 5, the perception elements may track the location of vehicle 450 from location 510 (shown in FIG. 5 in dashed lines) to location 520. Accordingly, the perception elements may plot the path of the vehicle 450 between the points of location 510 and location 520 to determine a past trajectory 530 for vehicle 450. The direction of trajectory 530 or heading of vehicle 450 is indicated by the arrow of trajectory 530. The speed of vehicle 450 may be determined by taking the change in location over the brief period of time.

Likewise, the perception elements may also track the location of the bicycle 460 from the location 540 (shown in FIG. 5 in dashed lines) to location 550. The perception elements may plot the path of the bicycle 460 between the points of location 540 and location 550 to determine a past trajectory 560. The direction of trajectory 560 or heading of the bicycle 460 may be indicated by the arrow of trajectory 560. Further, the speed of the bicycle 460 may be determined by determining the change in distance over the change in time.

In addition to moving objects, the perception elements may also track stationary objects over time to determine that such objects are in fact stationary. In this regard, some objects, such as the stop sign 440, which will not have moved in the brief period of time, may be identified as stationary. Based on the identification of nearby moving and stationary objects from the perception component 138, the CMBS 136 may select one or more of those objects to analyze for a possible collision with the vehicle 100. How "near" such objects are to the vehicle 100 is relative and may depend on various factors, such as the speed of the vehicle, the speed (if any) of the object(s), the types of objects, the type of roadway, weather conditions, etc. By way of example only, in a highway setting, the CMBS 136 may evaluate objects within 100 meters or more of the vehicle.

The control component 140 evaluates the objects of interest, along with trajectory information, to determine whether immediate braking is required. The control component 140, as noted above, desirably includes a filter, a stopping distance model, and a collision predictor. The stopping distance model calculates the distance for the vehicle 100 to come to a stop. The filter evaluates the identified objects of interest, and the collision predictor analyzes the information from the stopping distance model and the filter to determine whether a collision is possible, e.g., whether the likelihood of a collision exceeds a particular threshold. Each of the filter, stopping distance model, and collision predictor may be modules executable by one or more processors of the computing system 110. These components of the CMBS 136 may function concurrently with, but independently from, the autonomous or semi-autonomous driving protocols of the main driving system manager 142 on shared elements of the computing device 110. Alternatively, the elements of CMBS 136 may operate on one or more processors of the computing device that are entirely separate from the processing devices of the main driving system manager 142.

The stopping distance module calculates the distance to stop in accordance with the current movement of the vehicle, e.g., speed, acceleration, etc. The stopping distance module also factors into the stopping distance a model of the braking system, as well as a maximum deceleration (braking) amount. By way of example, the maximum deceleration amount is determined in accordance with passenger safety.

The filter considers the vehicle 100's trajectory and analyzes objects in the current path. Without filtering, there would likely be too many objects for the CMBS to handle, or too many false positive signals that would require unnecessary braking. For instance, in one scenario the filter would ignore stationary cars on the side of the road. In one aspect, the filter evaluates objects in the vehicle's way (e.g., a predicted intersection with the vehicle). In one alternative, the filter may not perform object classification or take into account the type of object. In this case, the filter would not factor in whether an object is a car, trash can, person, etc. However, truly irrelevant objects (e.g., tumbleweeds or blowing paper) would be filtered out.

Figure 6:
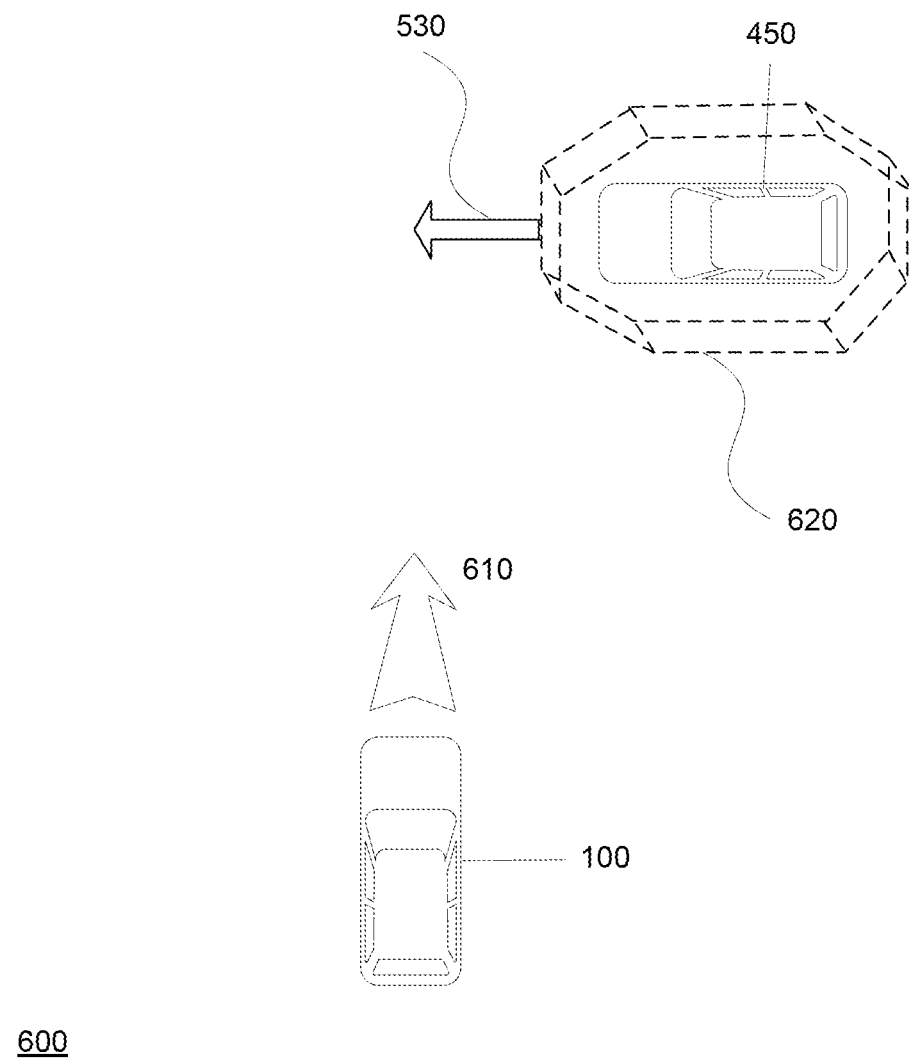
FIG. 6 illustrates features of collision mitigated braking in accordance with aspects of the disclosure.

Turning to FIG. 6, this figure shows some aspects of how the control component 140 of the CMBS 136 evaluates vehicle 450 to determine whether this object could collide with the vehicle 100. Here, illustration 600 shows only the vehicle 100 and the vehicle 450 from FIGS. 4 and 5, with other features from those figures being omitted for clarity. As shown, vehicle 450 has a trajectory 530 and vehicle 100 has a trajectory 610. In one example, one or both of the trajectory 530 or the trajectory 610 may be obtained by the control component 140 from the main driving system manager 142.

The filter creates a "padded polygon" 620 for the object of interest (e.g., vehicle 450). If a sweep of the path of the vehicle 100 would intersect a padded polygon of an object of interest, the CMBS 136 determines that there is the possibility of a collision. The padded polygon 620 shown in illustration 600 may be a three-dimensional area around the object of interest. The dimensions of the padded polygon 620 may be based on a variety of factors, including the size, speed and/or type of object (if the object type is considered).

Figure 7:
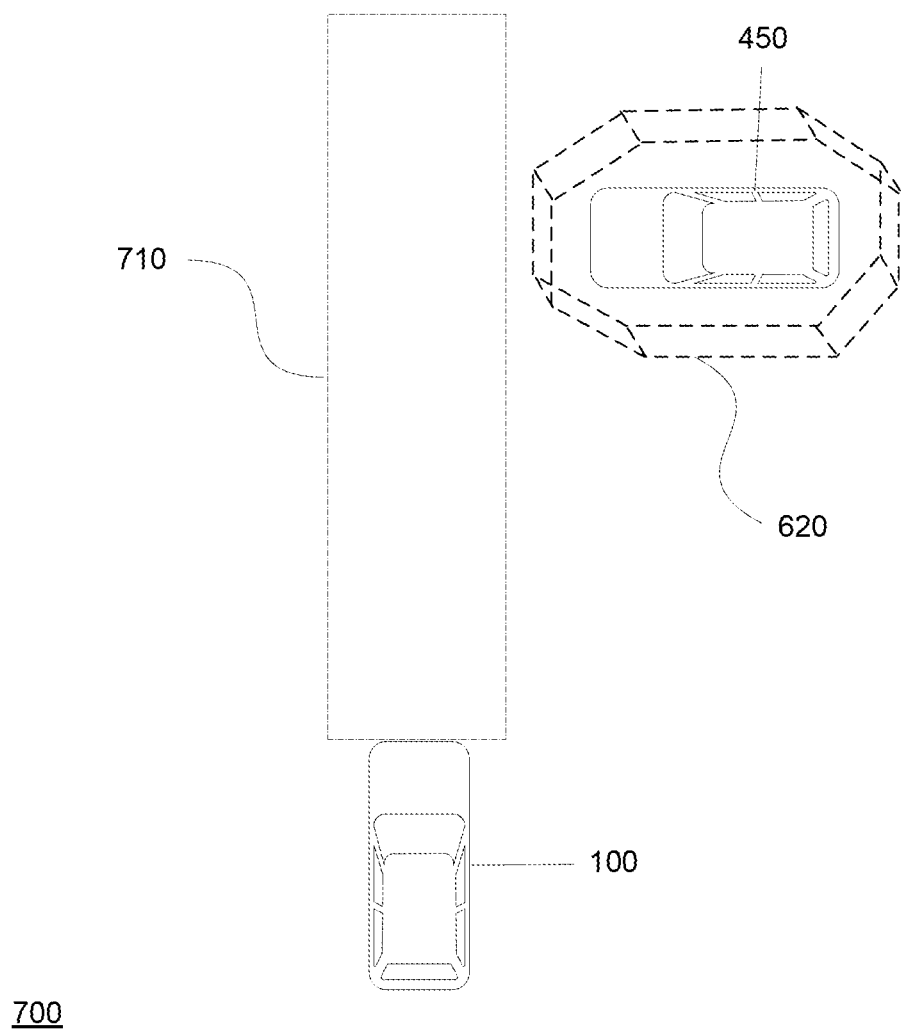
FIG. 7 illustrates other features of collision mitigated braking in accordance with aspects of the disclosure.

Turning to illustration 700 of FIG. 7, in addition to the padded polygon 620 of the object of interest, as discussed above the CMBS 136 also knows a current path 710 of the vehicle 100. The filter of the control component 140 may factor in a buffer (pole) distance from the front bumper of the vehicle 100 to account for braking (e.g., 5-10 meters), in accordance with one or both of the vehicle path and the size of the padded polygon of the object of interest. The filter may also evaluate a sweep trajectory that the front bumper would cover based on the current path of the vehicle. This sweep trajectory may incorporate a swept volume that encompasses a selected area slightly to the left and/or right of the vehicle (e.g., an extra meter on each side).

The collision predictor evaluates the set of filtered objects and predicts the future vehicle position at one or more points in time, in accordance with a primary path and speed plan (e.g., obtained from the planning component of the main driving system manager 142). It also predicts future positions for the filtered objects given their current position and speed (taken from the sensor data). If there is a predicted overlap between the vehicle and any object from the padded polygons, the CMBS 136 sends a message/signal to the deceleration (braking) system 160 to initiate hard braking, for instance in accordance with a maximum deceleration amount. For instance, the collision predictor may consider the vehicle 100's predicted path from a current time (t0) to some future time (t1). By way of example, the future time t1 may be in 1 second, 3 seconds, or any other time. Here, the filter may analyze where each object of interest and the vehicle will be at the future time, based on the instantaneous velocities of each.

Figure 8:
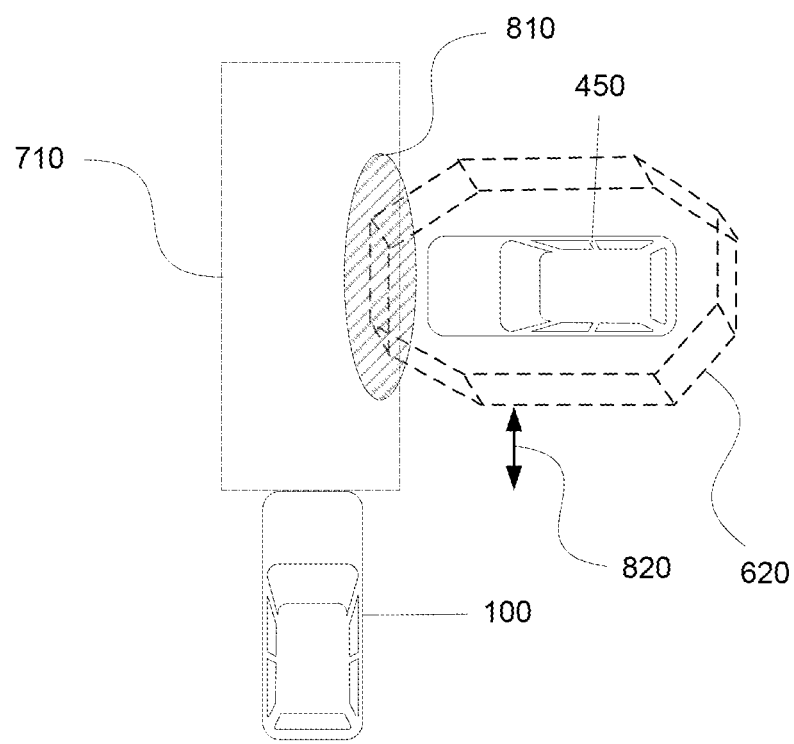
FIG. 8 illustrates further features of collision mitigated braking in accordance with aspects of the disclosure.

An example of this is discussed in relation to illustration 800 of FIG. 8. The illustration 800 presents a snapshot of what the collision predictor may predict at future time t1. Here, the current path 710 of the vehicle 100 is shown to have an overlap or intersection 810 with the padded polygon 620 of object (e.g., vehicle) 450. This figure also indicates a buffer distance (820) from the vehicle 100 to a closest point of the padded polygon 620. When the collision predictor predicts a possible collision at the future time t1, the CMBS 136 also determines whether the main driving system manager 142 has initiated deceleration, for instance by applying the brakes. In this case, when the brakes have been applied, the CMBS 136 may continue to evaluate whether a collision with the object of interest is possible. However, when the CMBS 136 determines that a collision is possible and a threshold distance has been met (e.g., if the vehicle 100 will come or has come closer than the buffer distance 820 to the vehicle 450) without the main driving system manager 142 initiated deceleration, then the CMBS 136 will initiate emergency braking to avoid a collision. This may be done, by way of example, by sending a signal or instructions to the deceleration system 160. Alternatively, the CMBS 136 may send an override signal to the main driving system manager 142 or other system in the vehicle 100 to begin emergency braking.

The emergency braking initiated by the CMBS 136 may bring the vehicle 100 to a complete stop. Here, the vehicle 100 may remain stationary until the danger of a collision has passed, and then at that point the main driving system manager 142 may continue in semi or full autonomous mode, or a person in the vehicle may operate it in manual driving mode. The emergency braking may involve maximum braking (deceleration) in accordance with the stopping distance model.

Optionally, once CMBS-initiated braking has started, the deceleration system 160 may either continue braking until the vehicle 100 comes to a complete stop, or to cease braking if there is no longer a danger of an imminent collision with the object of interest as determined by the CMBS 136. The latter option would mitigate the response due to a false positive by not causing the vehicle 100 to come to a complete stop. However, such operation could lead to false negatives or jerky operation of the vehicle 100.

In one alternative, an amount of braking less than the maximum could be employed. For instance, the CMBS 136 may use the stopping distance model, information from the filter, and information from the collision predictor to determine whether some other amount of braking can be employed to avoid a possible collision, e.g., by slowing down the vehicle 100 so that there is no longer an overlap or intersection with the padded polygon of the object of interest.

Another alternative would adjust the filtering process by the CMBS 136, so that more (or fewer) objects are considered in the autonomous car's path. Here, noise (e.g., inaccuracies in objects' speed and/or trajectory obtained from the sensors) may a concern that could contribute to a higher false positive rate. In one scenario, the CMBS and/or other components in the system 110 act to mitigate such noise or otherwise account for it.

Figure 9:
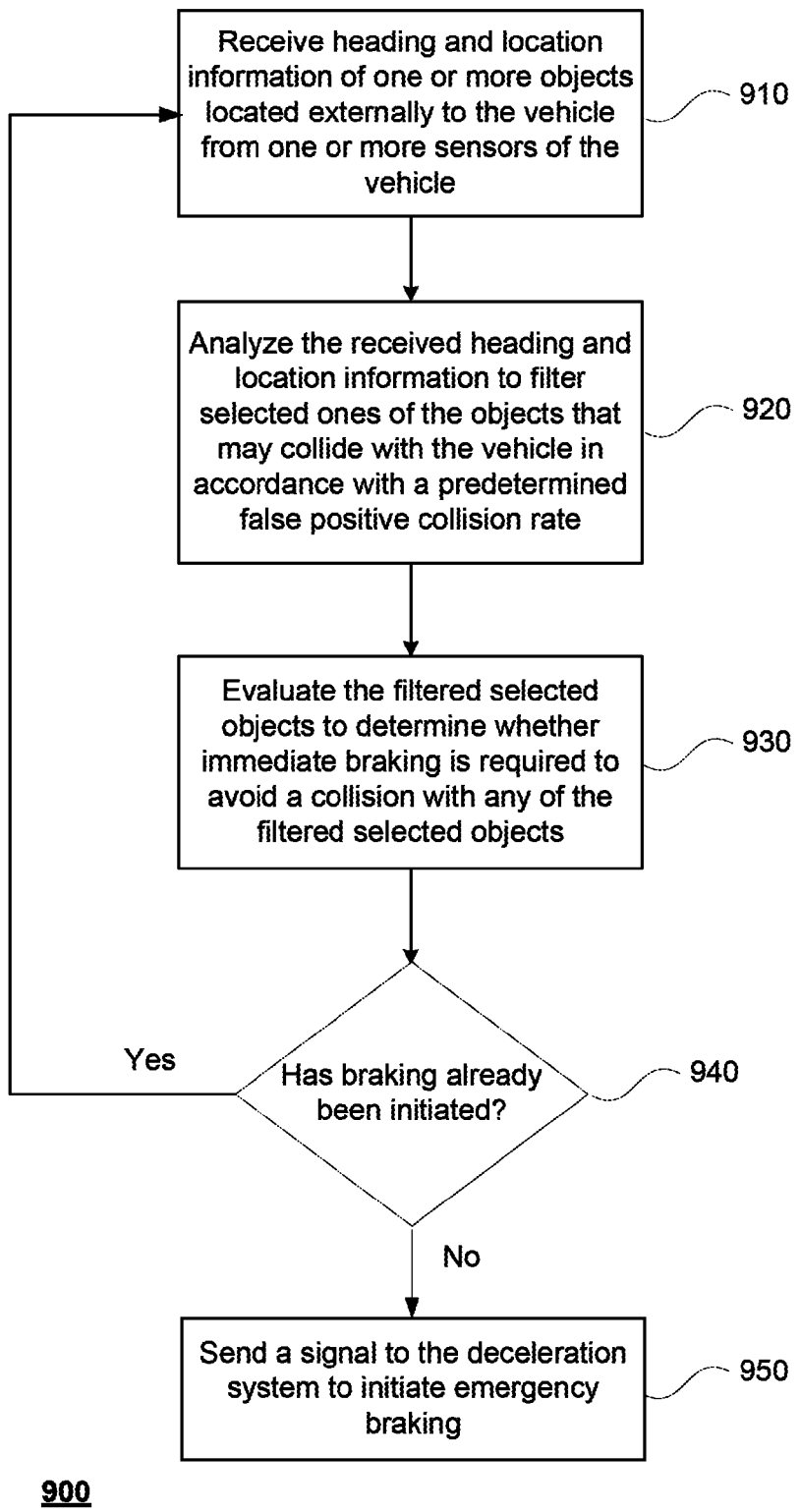
FIG. 9 is an example flow diagram in accordance with aspects of the disclosure.

FIG. 9 is an example flow diagram 900 which depicts some of the aspects described above which may be performed by one or more computing devices such as one or more computing devices 110 of vehicle 100. In this example, at block 910 heading and location information of one or more objects located outside the vehicle has been detected by one or more sensors of the vehicle and provided to the perception component 138 of CMBS 136. At block 920, the control component 140 of the CMBS 136 analyzes the received information to filter selected objects. This is done in accordance with a predetermined false positive collision rate, which may be a fixed or variable rate. At block 930, the control component 140 evaluates the filtered selected objects to determine whether immediate braking is required to avoid a possible collision. At block 940, the control component 140 determines whether braking or deceleration has already begun. For instance, the control component 140 may query the main driving system manager 142 to determine if the manager has begun a braking process. If so, the CMBS 136 may elect not to begin emergency braking. Here, the process may return to block 910. However, when it is determined that a braking process has not already begun, or that the possibility of an imminent collision still exists, the CMBS 136 sends a signal to the deceleration system 160 to initiate emergency braking.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method for collision mitigated braking in a vehicle operating in an autonomous mode, the method comprising:
   receiving, by one or more processors of one or more computing devices, heading and location information of one or more objects located externally to the vehicle from one or more sensors of the vehicle;
   analyzing, by the one or more processors, the received heading and location information to filter selected ones of the objects that may collide with the vehicle in accordance with a predetermined false positive collision rate;
   evaluating, by the one or more processors, the filtered selected objects to determine whether immediate braking is required to avoid a collision with any of the filtered selected objects;
   determining that a main driving system of the vehicle for the autonomous mode has not initiated braking during the autonomous mode; and
   in response to the evaluation and the determination, sending a signal from the one or more processors to a deceleration system of the vehicle to initiate immediate braking and thereby causing the deceleration system to brake;
   wherein filtering the selected objects includes applying a padded polygon to different objects detected by the one or more sensors to identify whether there is a potential for collision with the different detected objects, and a size and shape of each padded polygon is based on one or more factors selected from the group consisting of:
   a buffer braking distance from the front bumper of the vehicle to a respective object;
   a sweep volume of the front bumper; and
   the vehicle's predicted path from a current time to a future time.

2. The method of claim 1, wherein the analyzing comprises independently evaluating the received heading and location information from laser and radar sensors of the vehicle.

3. The method of claim 1, wherein evaluating the selected objects includes evaluating a stopping distance model to calculate a distance to stop based upon the current movement of the vehicle, a model of the braking system, and a maximum braking amount.

4. The method of claim 1, wherein evaluating the selected objects includes predicting a future position of the vehicle at one or more points in time, in accordance with a primary path and speed plan obtained from a planning component of the main driving system.

5. The method of claim 1, wherein the signal sent to the braking system of the vehicle to initiate immediate braking causes the braking system to bring the vehicle to a complete stop.

6. The method of claim 1, wherein the signal sent to the braking system of the vehicle to initiate immediate braking causes the braking system to slow the vehicle according to a minimal braking threshold.

7. The method of claim 6, wherein slowing the vehicle is performed until there is no longer a danger of imminent collision.

8. A vehicle control system for a vehicle, the vehicle control system comprising one or more computing devices configured to:
   receive heading and location information of one or more objects located externally to the vehicle from one or more sensors of the vehicle;
   analyze the received heading and location information to filter selected ones of the objects that may collide with the vehicle in accordance with a predetermined false positive collision rate;
   evaluate the filtered selected objects to determine whether immediate braking is required to avoid a collision with any of the filtered selected objects; and
   determine that a main driving system of the vehicle for the autonomous mode has not initiated braking during an autonomous driving mode; and
   in response to the evaluation and the determination, send a signal to initiate immediate braking of the vehicle to a deceleration system of the vehicle and thereby causing the deceleration system to brake;
   wherein the one or more computing devices are configured to filter the selected objects by applying a padded polygon to different objects detected by the one or more sensors to identify whether there is a potential for collision with the different detected objects, and a size and shape of each padded polygon is based on one or more factors selected from the group consisting of:
a buffer braking distance from the front bumper of the vehicle to a respective object;
a sweep volume of the front bumper; and
the vehicle's predicted path from a current time to a future time.

9. The system of claim 8, wherein evaluation of the selected objects by the system includes the one or more computing devices being configured to predict a future position of the vehicle at one or more points in time, in accordance with a primary path and speed plan obtained from a planning component of the main driving system.

10. The system of claim 8, wherein the signal sent to the braking system of the vehicle to initiate immediate braking causes the braking system to bring the vehicle to a complete stop.

11. The system of claim 8, wherein the signal sent to the braking system of the vehicle to initiate immediate braking causes the braking system to slow the vehicle according to a minimal braking threshold.

12. The system of claim 11, wherein slowing the vehicle is performed until there is no longer a danger of imminent collision.

13. A non-transitory computer-readable medium on which instructions are stored, the instructions, when executed by one or more processors, cause the one or more processors to perform a method for collision mitigated braking in a vehicle operating in an autonomous mode, the method comprising:
receiving heading and location information of one or more objects located externally to the vehicle from one or more sensors of the vehicle;
analyzing the received heading and location information to filter selected ones of the objects that may collide with the vehicle in accordance with a predetermined false positive collision rate;
evaluating the filtered selected objects to determine whether immediate braking is required to avoid a collision with any of the filtered selected objects; and
determining that a main driving system of the vehicle for the autonomous mode has not initiated braking during the autonomous mode; and
in response to the evaluation and the determination, sending a signal from the one or more processors to a deceleration system of the vehicle to initiate immediate braking and thereby causing the deceleration system to brake;
wherein filtering the selected objects includes applying a padded polygon to different objects detected by the one or more sensors to identify whether there is a potential for collision with the different detected objects, and a size and shape of each padded polygon is based on one or more factors selected from the group consisting of:
a buffer braking distance from the front bumper of the vehicle to a respective object;
a sweep volume of the front bumper; and
the vehicle's predicted path from a current time to a future time.

14. The non-transitory computer-readable medium of claim 13, wherein the analyzing comprises independently evaluating the received heading and location information from laser and radar sensors of the vehicle.

15. The non-transitory computer-readable medium of claim 13, wherein evaluating the selected objects includes evaluating a stopping distance model to calculate a distance to stop based upon the current movement of the vehicle, a model of the braking system, and a maximum braking amount.

* * * * *